United States Patent [19]

Sakai

[11] Patent Number: 5,321,569
[45] Date of Patent: Jun. 14, 1994

[54] ROTARY MAGNETIC HEAD DRUM ASSEMBLY
[75] Inventor: Seiichi Sakai, Tokyo, Japan
[73] Assignee: Sony Corporation, Tokyo, Japan
[21] Appl. No.: 910,408
[22] Filed: Jul. 8, 1992
[30] Foreign Application Priority Data Jul. 12, 1991 [JP] Japan .................. 3-197368

[51] Int. Cl.⁵ .............................................. G11B 21/18
[52] U.S. Cl. ...................... 360/107; 360/108
[58] Field of Search ............... 360/84, 85, 95, 107, 360/108

[56] References Cited

U.S. PATENT DOCUMENTS

| 4,508,405 | 4/1985 | Damon et al. | 439/824 |
| 4,835,645 | 5/1989 | Ohji et al. | 360/108 |
| 5,070,424 | 12/1991 | Ono et al. | 360/108 |
| 5,086,361 | 2/1992 | Kawada et al. | 360/107 |
| 5,113,298 | 5/1992 | Fukushima et al. | 360/108 |

FOREIGN PATENT DOCUMENTS 0349430 1/1990 European Pat. Off. .

OTHER PUBLICATIONS

Patent Abstracts of Japan, vol. 7, No. 282 (P-243) (1427) Dec. 16, 1983 & JP-A-58 169 207 (Kiyanon Denshi K.K.) Sep. 21, 1983.
Patent Abstracts of Japan vol. 9, No. 156 (P-368) (1879) Jun. 29, 1985 & JP-A-60 029 903 (Sony K.K.) Feb. 15, 1985.
Patent Abstracts of Japan vol. 15, No. 51 (P-1163) Feb. 6, 1991 & JP-A-02 282 905 (Matsushita Electric Ind. Co., Ltd.) Nov. 20, 1990.
Patent Abstracts of Japan vol. 13, No. 505 (P-959) (3853) Nov. 14, 1989 & JP-A-01 204 213 (Hitachi Ltd.) Aug. 16, 1989.
Patent Abstracts of Japan vol. 13, No. 30 ({-816) (3378) Jan. 24, 1989 & JP-A-63 228 409 (Hitachi Electronics Eng. Co. Ltd.) Sep. 22, 1988.

Primary Examiner—John H. Wolff
Assistant Examiner—David L. Ometz
Attorney, Agent, or Firm—William S. Frommer; Alvin Sinderbrand

[57] ABSTRACT

The present invention enables, in assembling a rotary magnetic head drum assembly including a rotary magnetic head drum and a drum base, the automatic, electrical connection of the signal lines of the rotary magnetic head drum to external amplifiers. In the magnetic head drum assembly, lands (15) connected to the signal lines of a rotary magnetic head drum (1) are brought into contact respectively with the upper ends of the spring pins (20a) of a plurality of spring pin connectors (20) mounted on a connector base plate (18) attached to a drum base (11) supporting a stationary magnetic head drum (3), with the spring pins (20a) extending upward, and connected to external amplifiers, when the assembly of the rotary magnetic head drum (1) and the stationary magnetic head drum (3) is mounted on the drum base (11).

8 Claims, 7 Drawing Sheets

ROTARY MAGNETIC HEAD DRUM ASSEMBLY

BACKGROUND OF THE INVENTION

1. Field of the Invention

The present invention relates to a rotary magnetic head drum assembly suitable for application to, for example, a digital video tape recorder and, more particularly, to improvements in the electrical connection of the signal system in assembling the rotary magnetic head drum and the drum base of a rotary magnetic head drum assembly.

2. Description of the Prior Art

Generally, the signal system of the rotary magnetic head drum of a video tape recorder is connected electrically to external amplifiers by a wiring harness or a flexible printed wiring board.

The rotary magnetic head drum of a digital video tape recorder, i.e., a video tape recorder capable of high-density magnetic recording, is provided with as many as ten-odd revolving magnetic heads, and the number of signal lines of the driving system for driving the rotary magnetic head drum has increased with the enhancement of performance, entailing an increase in the number of signal lines connected to the rotary magnetic head drum. On the other hand, the progressive reduction in size and weight of digital video tape recorders, as well as those of other video tape recorders, requires a reduction in the diameter of the rotary magnetic head drum which, nevertheless is required to be constructed to exhibit at least the same mechanical strength as larger drums.

In the digital video tape recorder, in particular, the small rotary magnetic head drum has many signal lines and the electrical connection of the signal lines by a wiring harness or a flexible printed wiring board to external amplifiers requires troublesome work in assembling or disassembling the rotary magnetic head drum and the drum base of the digital video tape recorder.

A previously proposed method of electrically connecting the signal lines of the rotary magnetic head drum to external amplifiers uses plug-in connectors in a plurality of connector pockets formed in the lower drum of a rotary magnetic head drum, fixes the plug-in connectors to the lower drum, and plugs plug-in connectors connected to external amplifiers from below the drum base to the plug-in connectors fixed to the lower drum. However, the plurality of connector pockets formed in the lower drum of the rotary magnetic head drum which has a small diameter reduces the mechanical strength of the lower drum greatly, and the task of plugging the plug-in connectors connected to the external amplifiers one by one from below the drum base to the plug-in connectors connected to the signal lines of the rotary magnetic head drum is very troublesome.

SUMMARY OF THE INVENTION

The present invention has been made to solve the foregoing problems and it is therefore an object of the present invention to provide a rotary magnetic head drum assembly having a rotary magnetic head drum and a drum base, capable of automatically and electrically connecting the signal lines of the rotary magnetic head drum to external amplifiers by seating the lower drum of the rotary magnetic head drum on the drum base.

To achieve this object, a rotary magnetic head drum assembly in a first aspect of the present invention has input and output terminals connected to the signal lines of the rotary magnetic head drum and arranged on the lower end of the rotary magnetic head drum so as to be brought into contact respectively with the spring pins of spring pin connectors connected to external amplifiers and attached to the drum base with the spring pins thereof extending upward when the rotary magnetic head drum is mounted on the drum base. When the rotary magnetic head drum of the rotary magnetic head drum assembly is mounted on the drum base, the input and output terminals connected to the signal lines of the rotary magnetic head drum come into contact with the upper ends of the spring pins of the spring pin connectors attached to the drum base from above the spring pins, thereby to connect the signal lines of the rotary magnetic head drum automatically and electrically to the external amplifiers. Accordingly, very troublesome connecting work using wiring harnesses or flexible printed wiring boards is not necessary in assembling the rotary magnetic head drum assembly, which greatly facilitates assembling and disassembling the rotary magnetic head drum assembly. Since the lower drum of the rotary magnetic head drum need not be provided with any large holes for receiving connectors, the mechanical strength of the lower drum is not reduced and this enables a further reduction in the size and weight of the rotary magnetic head drum.

A rotary magnetic head drum assembly in a second aspect of the present invention positions a connector base plate to which the spring pin connectors are attached relative to the rotary magnetic head drum. In mounting the rotary magnetic head drum of the rotary magnetic head drum assembly, since the connector base plate attached to the drum base is positioned relative to the rotary magnetic head drum, the spring pins of the spring pin connectors attached to the connector base are not dislocated from correct positions respectively corresponding to the input and output terminals connected to the signal lines of the rotary magnetic head drum. Hence, the output terminals can be correctly connected to the corresponding spring pins.

A rotary magnetic head drum assembly in a third aspect of the present invention enables the connector base plate to move on the drum base at least in directions perpendicular to the direction of the thickness thereof. In mounting the rotary magnetic head drum of the rotary magnetic head drum assembly on the drum base, the positioning of the connector base plate relative to the rotary magnetic head drum can be easily achieved because the connector base plate is able to move at least in directions perpendicular to the direction of the thickness thereof. Consequently, assembling the rotary magnetic head drum assembly is facilitated and the connector base plate, the drum base, the drum base and the rotary magnetic head drum are not subject to excessively large forces which could produce deformation.

A rotary magnetic head drum assembly in a fourth aspect of the present invention positions the spring pin connectors on the connector base plate by positioning pins. As a result, the dislocation of the spring pins of the spring pin connectors from correct positions corresponding to the input and output terminals connected to the signal lines of the rotary magnetic head drum due to the accumulation of positional tolerances, for the spring pins can be eliminated. Consequently, the input and output terminals can be correctly connected to the corresponding spring pins.

A rotary magnetic head drum assembly in a fifth aspect of the present invention uses the aforementioned positioning pins also for positioning the connector base plate relative to the rotary magnetic head drum. This reduces the number of component parts of the drum assembly and enables the input and output terminals connected to the signal lines of the rotary magnetic head drum to be brought into contact with the corresponding spring pins with high accuracy and minimal dislocation.

BRIEF DESCRIPTION OF THE DRAWINGS

The above and other objects, features and advantages of the present invention will become more apparent from the following description taken in connection with the accompanying drawings, in which.

DESCRIPTION OF THE PREFERRED EMBODIMENTS

A rotary magnetic head assembly in a preferred embodiment according to the present invention will be described hereinafter with reference to the accompanying drawings as applied to a digital video tape recorder.

Figure 1:
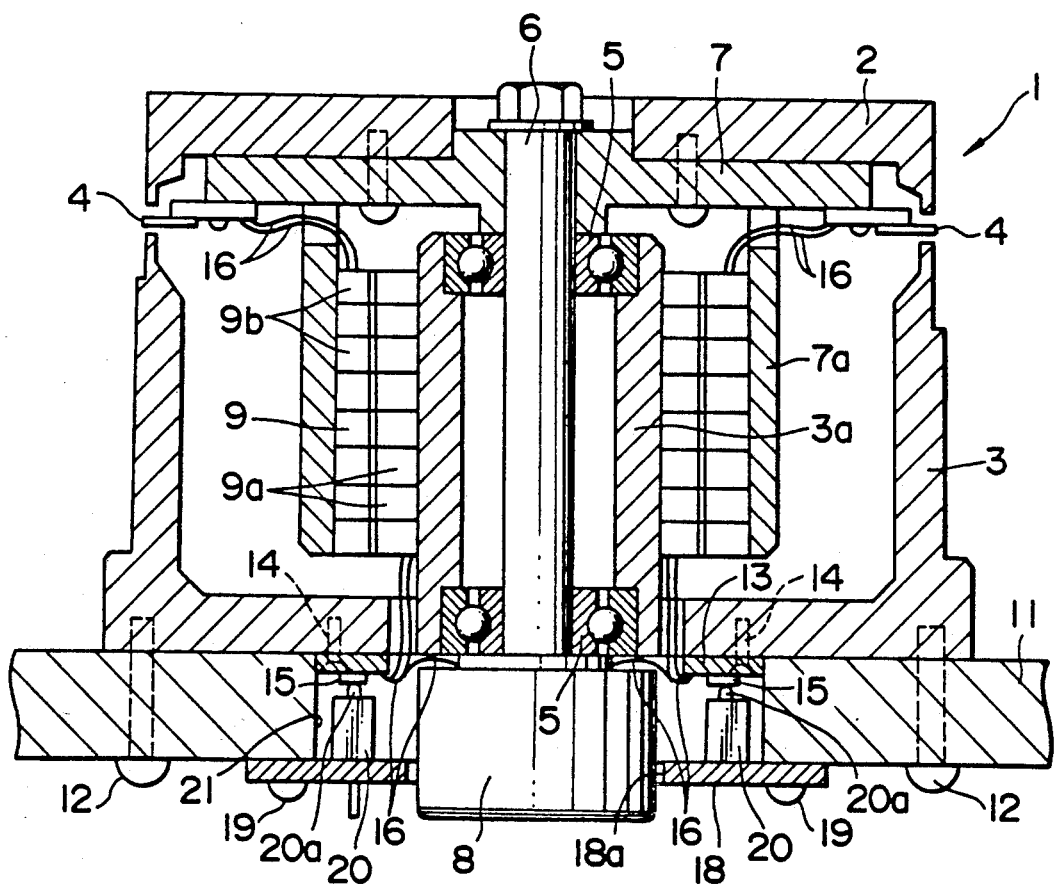
FIG. 1 is a longitudinal sectional view of a rotary magnetic head drum assembly in a preferred embodiment according to the present invention.

First the rotary magnetic head drum assembly will be described with reference to FIG. 1.

A rotary magnetic head drum 1 is constructed by coaxially combining an upper drum 2, i.e., a rotary drum, and a lower drum 3, i.e., a stationary drum. A plurality of revolving magnetic heads 4, (for example, ten-odd revolving magnetic heads) are attached to the outer circumference of the upper drum 2 so as to be disposed between the upper drum 2 and the lower drum 3. The lower drum 3 is provided integrally, internally and coaxially with an inner boss 3a, and a spindle 6 is supported for rotation in a pair of ball bearings 5 fitted in the inner boss 3a. A disk 7 combined with the upper drum 2 is fixed to the upper end of the spindle 6. A spindle motor 8 is connected to the lower end of the spindle 6 to rotate the upper drum 2 together with the revolving magnetic heads 4. The disk 7 is provided integrally and coaxially with a cylinder 7a extending downward from the lower surface of the disk 7. When the disk 7 is fixed to the upper end of the spindle 6, the cylinder 7a of the disk 7, and the inner boss 3a of the lower drum 3 are coaxial and an annular space is formed between the cylinder 7a and the inner boss 3a. A plurality of rotary transformers 9 having stationary components 9a and rotary components 9b, respectively, are stacked in the annular space between the cylinder 7a and the inner boss 3a. The lower drum 3 of the rotary magnetic head drum 1 is seated on the upper surface of a drum base 11 and fastened to the drum base 11 with a plurality of screws 12 to fix the rotary magnetic head drum 1 to the drum base 11.

Figure 8A:
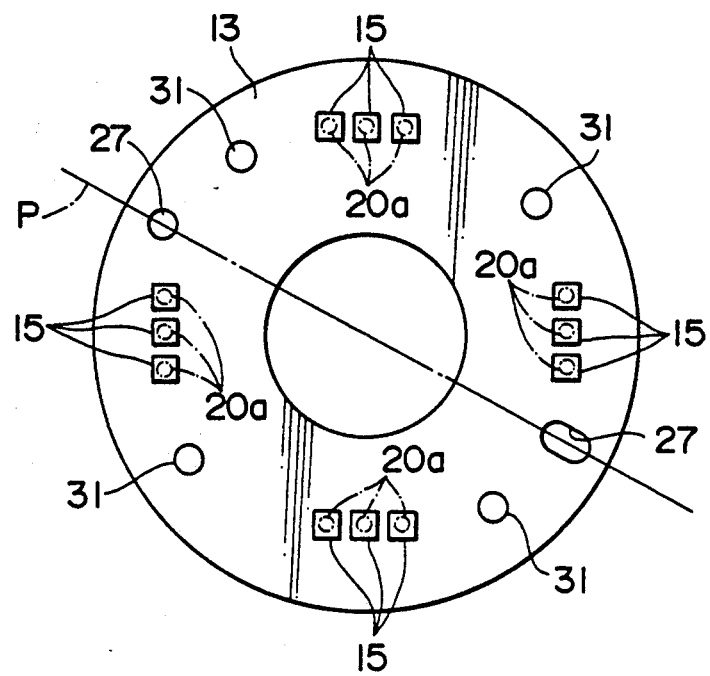
FIGS. 8(A) and 8(B) are plan views, respectively, which illustrate the manner of positioning the spring pins relative to lands formed on a terminal board.

An annular terminal board 13 is fastened to the lower surface of the lower drum 3 with a plurality of screws 14 so as to surround the spindle motor 8. As shown in FIG. 8(A), a plurality of lands 15, i.e., input and output terminals connected to the signal lines of the rotary magnetic head drum, are formed on the lower surface of the terminal board 13, and lead wires extending from the rotary transformers 9 and connected to signal lines of the recording system and reproducing system of the revolving magnetic heads 4, and a plurality of signal lines of a wiring harness 16 (or a flexible printed wiring board) connected to a driving system for driving the spindle motor 8 are soldered, respectively to the lands 15.

Figure 2A:
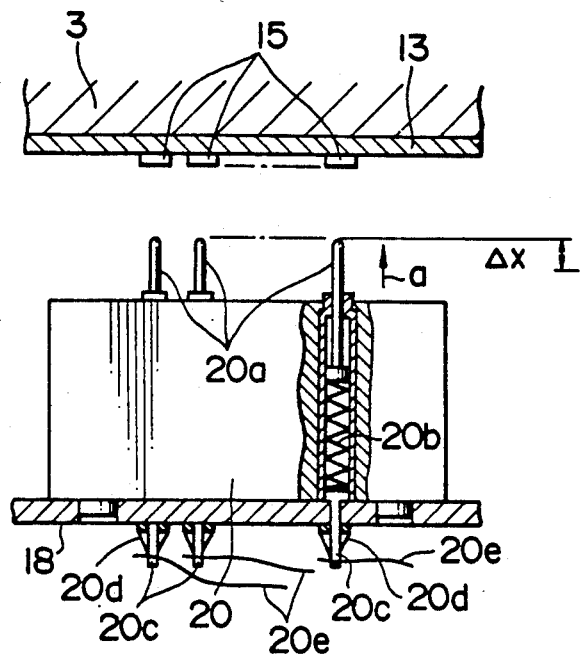
FIGS. 2(A) and 2(B) are partly sectional side elevations, respectively, which are useful in explaining a spring pin connector.
Figure 8B:
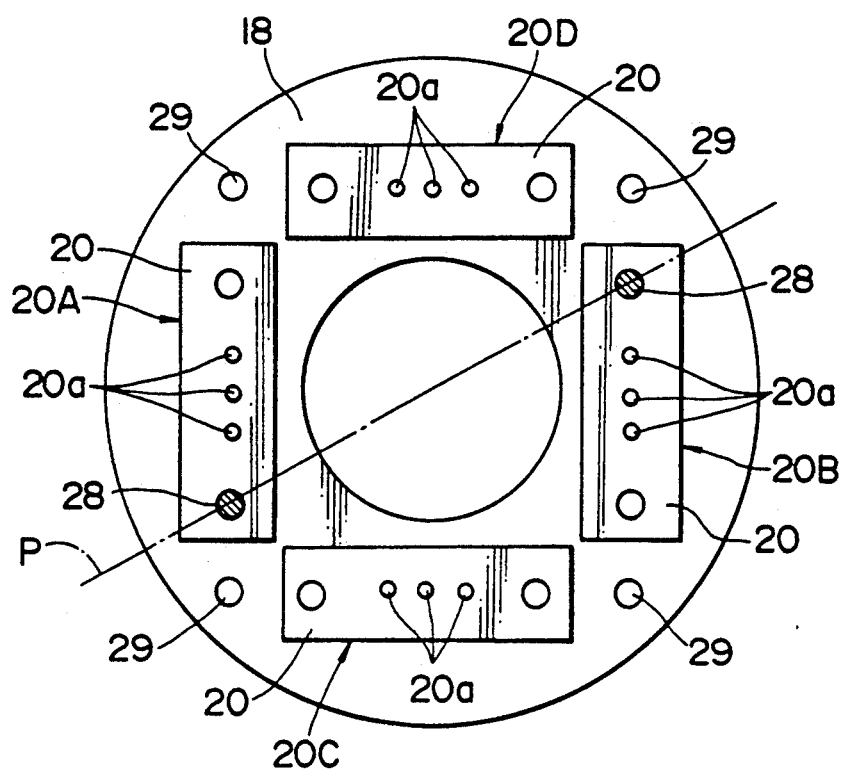

An annular connector base plate 18 is attached to the lower surface of the drum base 11 with a plurality of shoulder bolts 19 so as to surround the spindle motor 8. As shown in FIG. 8(B), a plurality of spring pin connectors 20 attached to the upper surface of the connector base plate 18 with their spring pins 20a extending upward are inserted in openings 21 formed around the spindle motor 8 in the base drum 11 from below. As shown in FIG. 2(A) the lands 15 come into contact with the upper ends of the spring pins 20a of the spring pin connectors 20 when the rotary magnetic head drum 1 is mounted on the drum base 11. The spring pins 20a are connected respectively to external amplifiers, not shown, by a wiring harness 20e.

When the lower drum of the rotary magnetic head drum of the rotary magnetic head drum assembly is fastened to the upper surface of the drum base 11, the lands 15 serving as input and output terminals connected to the signal lines of the rotary magnetic head drum 1 come into contact with the upper ends of the spring pins 20a of the spring pin connectors 20 to achieve the electrical connection of the signal lines of the rotary magnetic head drum 1 to the external amplifiers automatically.

The components of the rotary magnetic head drum assembly will be described in detail hereinafter.

First, the spring pin connectors 20 will be described with reference to FIGS. 2(A), 2(B) and 3.

Each spring pin connector 20 is provided with the plurality of spring pins 20a, for example, several or several tens spring pins. As shown in FIG. 2(A), each spring pin 20a is biased upward in the direction of the arrow a by a compression coil spring 20b and connected to a terminal 20c projecting downward from the lower surface of the connector base plate 18 and held in place by a bump 20d of solder.

Figure 2B:
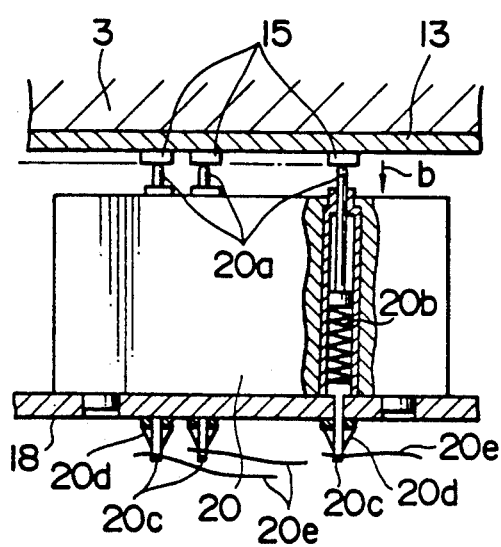
Figure 3:
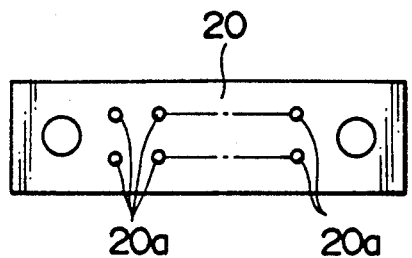
FIG. 3 is a plan view which is useful in explaining a spring pin connector.
Figure 4:
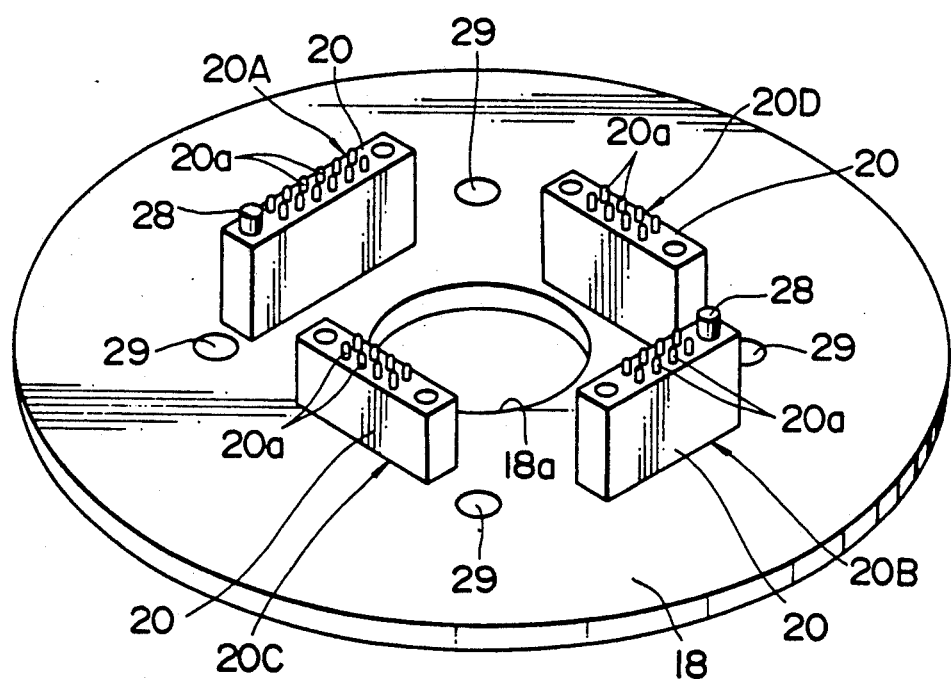
FIG. 4 is a perspective view helpful in explaining a connector base plate.
Figure 5:
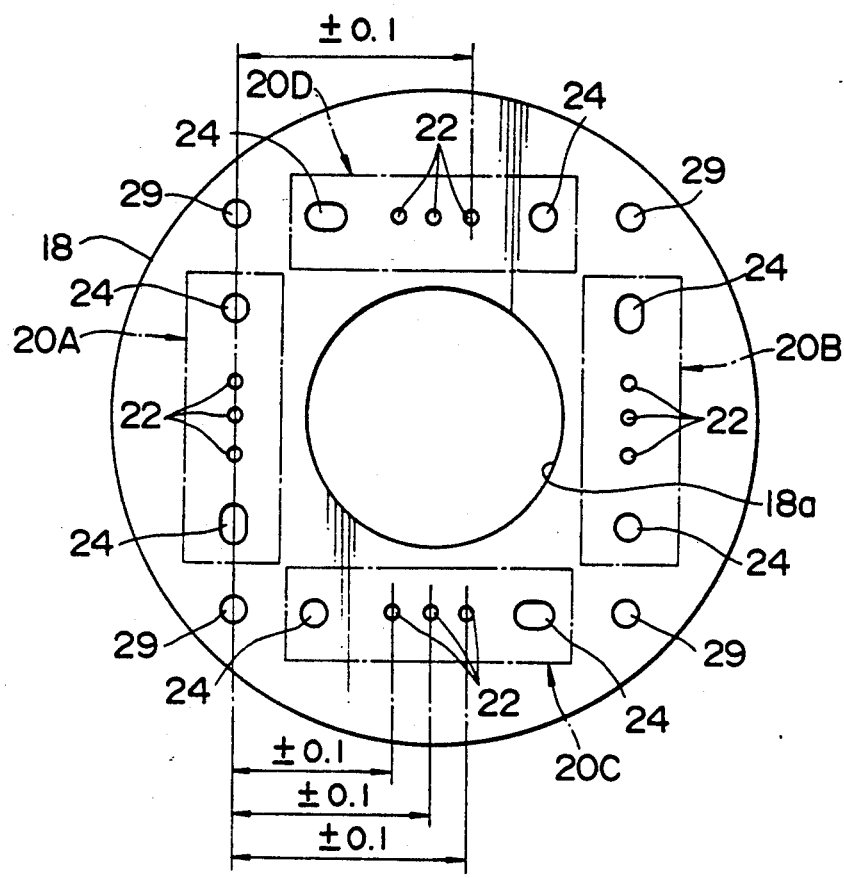
FIG. 5 is a plan view helpful in explaining the manner of positioning spring pin connectors on the connector base plate.

As shown in FIG. 2(B), when the rotary magnetic head drum 1 is mounted on the drum base 11, the land 15 of the terminal board 13 depresses the corresponding spring pin 20a against the resilience of the compression coil spring 20b in the direction of the arrow b by a distance Δx. The compression coil spring 20a maintains a contact pressure between the land 15 and the spring pin 20a.

The positioning of the spring pin connectors 20 on the connector base plate 18 and the positional accuracy of the spring pin connectors 20 will be described hereinafter with reference to FIGS. 4, 5, 6(A) and 6(B).

The four spring pin connectors 20(A), 20(B), 20(C) and 20(D) are attached to the upper surface of the connector base plate 18 in a substantially square arrangement around the central hole 18a of the connector base plate 18. The spring pin connector 20A to transmit the signals of the recording system of the revolving magnetic heads 4 of the rotary magnetic head drum 1 and the spring pin connector 20B to transmit the signals of the recording system of the revolving magnetic heads 4 of the rotary magnetic head drum 1 are disposed opposite to each other with respect to the center of the connector base plate 18 at a substantially large interval to prevent crosstalk between the signals of the recording system and those of the reproducing system. Signals of the driving system for driving the spindle motor 8 are transmitted by the spring pin connectors 20C and 20D.

Figure 6A:
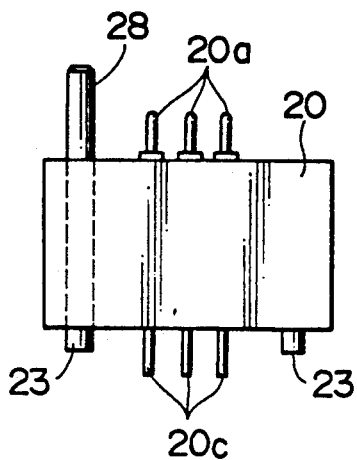
FIGS. 6(A) and 6(B) are side elevations, respectively, which are helpful in explaining a manner of positioning the spring pin connector.
Figure 6B:
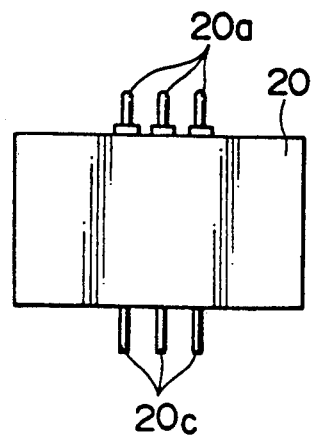

In positioning the spring pin connector 20 by inserting the terminals 20c of the spring pin connector 20 shown in FIG. 6(B) in through holes 22 (FIG. 5) formed in the connector base plate 18, the dislocation of the opposite spring pin connectors 20A and 20B relative to each other is, at a maximum, ±0.2 mm if the accuracy in the pitch of the through holes 22 of the connector base plate 18 is ±0.1 mm. If the diameter of the terminals 20c is D, the diameter of the through holes 22 is about D+0.2 mm and hence the play of the spring pin connectors 20A, 20B, 20C and 20d is ±0.1 mm at a maximum. Since the accuracy of the diameter of the through holes 22 is on the order of ±0.1 mm, the accumulated dimensional tolerance is ±0.2+2×±0.1+±0.1 mm=±0.5 mm at a maximum, which is relatively large. To allow the accumulated dimensional tolerance as large as ±0.5 mm, the size of the lands 15 must be 1×1 mm² or greater.

As shown in FIG. 6(A), a pair of positioning pins 23 are attached to the spring pin connector 20 respectively in the longitudinally opposite ends of the same so as to project from the lower surface of the same, positioning holes 24, i.e., a round hole and a slot, are formed respectively at the opposite ends of each row of the through holes 22, and the positioning pins 23 are inserted in the positioning holes 24 to position the spring pin connectors 20A, 20B, 20C and 20D on the connector base plate 18. When the spring pin connectors 20A, 20B, 20C and 20D are positioned in such a manner, the tolerance for the diameter of the through holes 22 is negligible. Consequently, the cumulative dimensional tolerance can be limited to a value not greater than ±0.2 mm and hence the lands 15 need not be very large. Accordingly, it is possible to arrange the lands 15 and the spring pins 20a at reduced pitches and the signal lines can be accurately connected in a small area.

The positioning of the rotary magnetic head drum 1 and the connector base plate 18 will be described hereinafter with reference to FIGS. 7, 8(A), 8(B), 9(A) and 9(B).

Figure 7:
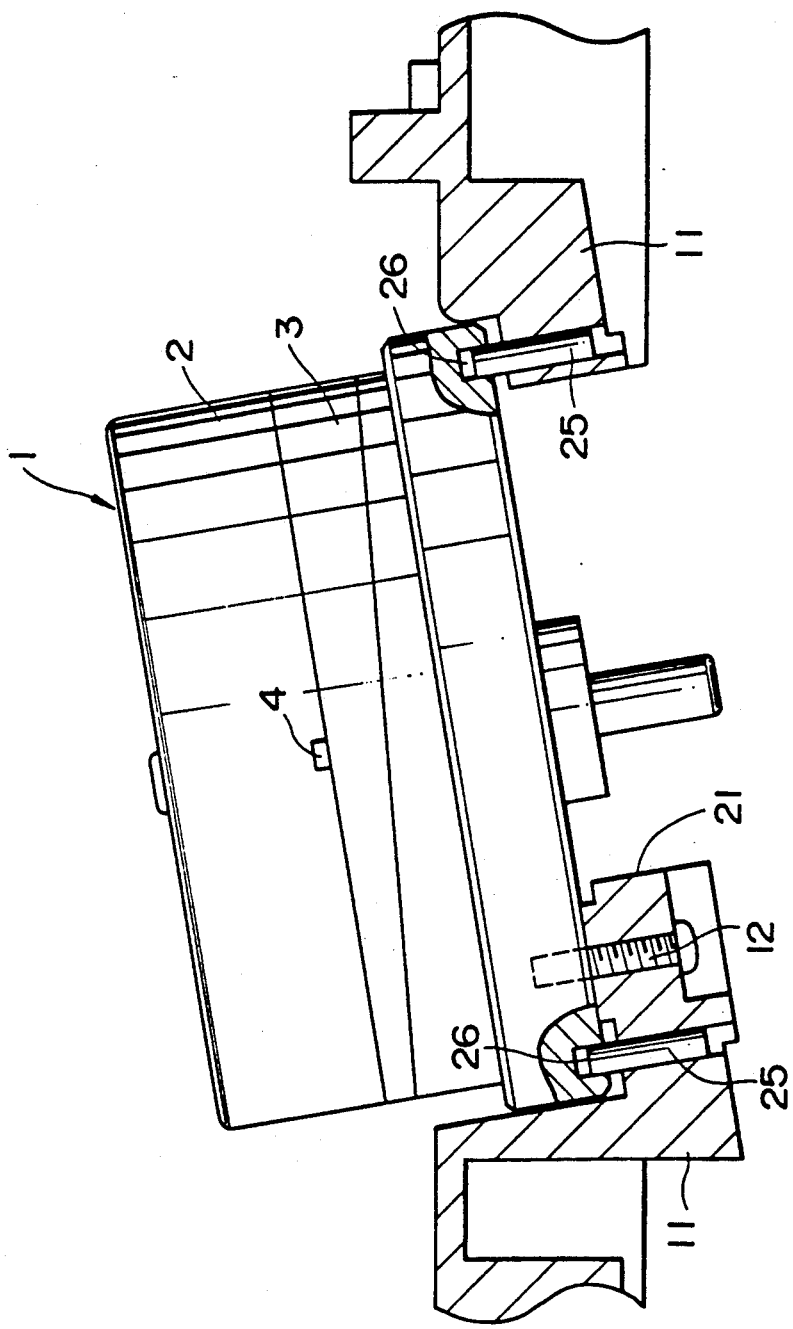
FIG. 7 is a sectional side elevation illustrative of the positioning a rotary magnetic head drum.

As shown in FIG. 7, a plurality of positioning pins 25, i.e., drum positioning means, projecting from the upper surface of the drum base 11 fit in a plurality of positioning holes 26 formed in the lower surface of the lower drum 3 to position the rotary magnetic head drum 1 on the drum base 11 when the rotary magnetic head drum 1 is mounted on the drum base 11. The lower drum 3 is fastened to the drum base 11 with the plurality of screws 12 screwed in the lower drum 3 from below the drum base 11.

Figure 9A:
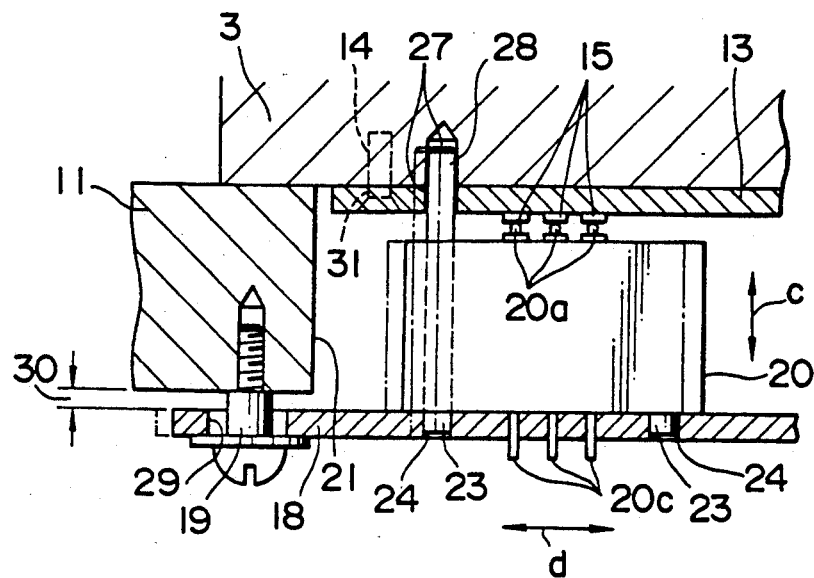
FIGS. 9(A) and 9(B) are fragmentary sectional views which explain the manner of positioning the connector base plate on a rotary magnetic head drum.

As shown in FIGS. 8(A) and 9(A), positioning holes 27, i.e., a round hole and a slot, serving as connector positioning means, are formed in the lower surface of the lower drum 3 of the rotary magnetic head drum 1 at positions corresponding to positions near the opposite ends of a diameter P of the terminal board 13, respectively. As shown in FIG. 8(B), a pair of positioning pins 28, i.e., connector positioning means, are attached to the upper surface of the terminal board at positions near the opposite ends of a diameter P of the connector base plate 18, respectively. The positioning pins 28 are the upper ends of the two positioning pins 23 among the four positioning pins 23 for positioning the spring pin connectors 20 on the connector base plate 18. The terminal board 13 is positioned by using the positioning holes 27 and fastened to the lower surface of the lower drum 3 with the screws 14 inserted through through holes 31.

In mounting the rotary magnetic head drum 1 on the drum base 11, the pair of positioning pins 28 are fitted in the positioning holes 27, respectively to position the connector base plate 18 on the rotary magnetic head drum 1 so that the lands 15 are in accurate contact with the spring pins 20a, respectively.

As shown in FIG. 9(A), the connector base plate 18 is attached to the lower surface of the drum base 11 with the shoulder bolts 19 screwed through the through holes 29 into the drum base 11. The diameter of the through holes 29 of the connector base plate 18 is greater than the diameter of the shoulder bolts 19. A gap 30 is formed between the lower surface of the drum base 11 and the upper surface of the connector base plate 18. Accordingly, the terminal base plate 18 is able to move in both directions of the arrow c, i.e., along the direction of the thickness of the connector base plate 18, and also in the directions of the arrow d, i.e., perpendicular to the direction of the thickness of the connector base plate 18.

Figure 9B:
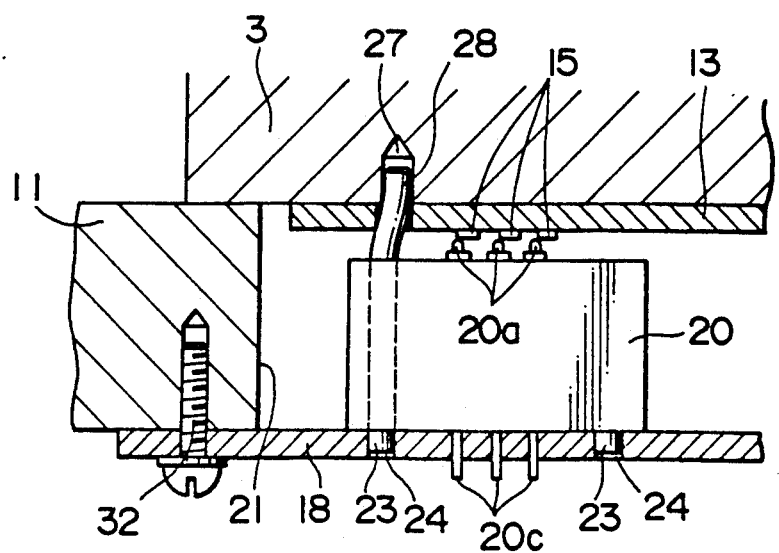

If the connector base plate 18 is perfectly fixed to the drum base with screws 32 as shown in FIG. 9(B), in some cases, the positioning pins 28 are unable to be fitted accurately in the positioning holes 27. In that case, if positioning pins 28 are forcibly fitted in the positioning holes 27, the pins are deformed, which may possibly exert a strain on the connector base plate 18, the drum base 11 and the lower drum 3.

However, when the connector base plate 18 is able to move in all directions (the directions indicated by the arrows c and d) relative to the drum base 11 as shown in FIG. 9(A), the positioning pins 28 are able to drop smoothly into the positioning holes 27 when the rotary magnetic head drum 1 is mounted on the drum base 11, and a strain is not exerted on the connector base plate 18, the drum base 11 and the lower drum 3 by the positioning pins 28. The movement of the connector base plate 18 in the directions of the arrow c obviates subjecting the lands 15 and the spring pins 20a to an excessively large force.

The rotary magnetic head drum assembly thus assembled need not be provided with large holes in the lower drum 3 to receive the connectors therein, and hence the mechanical strength of the lower drum 3 is not reduced.

Although the invention has been described in its preferred forms with a certain degree of particularity, obviously many changes and variations are possible therein. It is therefore to be understood that the present invention may be practiced otherwise than as specifically described herein without departing from the scope and spirit thereof.

What is claimed is:

1. A rotary magnetic head drum assembly comprising:
    a rotary magnetic head drum provided with a plurality of revolving magnetic heads and having signal lines electrically coupled to said heads;
    a stationary magnetic head drum rotatably supporting the rotary magnetic head drum, said stationary magnetic head drum having a lower surface;
    a drum base fixedly supporting the stationary magnetic head drum thereon;
    a plurality of input and output terminals provided on the lower surface of the stationary magnetic head drum and connected to the signal lines of the rotary magnetic head drum; and
    a connector assembly comprising a connector base plate attached to the lower surface of the drum base, spring pin connector means for supporting a plurality of spring pins, said spring pin connector means being attached to the upper surface of the connector base plate with the spring pins supported thereby extending upward so that the spring pins are in elastic contact with the input and output terminals when the stationary magnetic head drum is mounted on the drum base.

2. A rotary magnetic head drum assembly according to claim 1, further comprising positioning pins for positioning the spring pin connector means on the connector base plate in predetermined location.

3. A rotary magnetic head drum assembly according to claim 2, wherein each of at least two of said positioning pins has an upper end projecting upward from the spring pin connector means for fitting into a matching positioning hole of the drum base to position the connector base plate on the drum base and a lower end projecting downward from the spring pin connector means for fitting into a matching positioning hole of the connector base plate to position the spring pin connector means on the connector base plate.

4. A rotary magnetic head drum assembly according to claim 1, further comprising connector positioning means for positioning the connector base plate relative to the stationary magnetic head drum in predetermined location so that the spring pins of the spring pin connector means are aligned respectively with the input and output terminals.

5. A rotary magnetic head drum assembly according to claim 4, wherein the connector positioning means includes at least two positioning pins provided on he spring pin connector means and fitted in positioning holes formed in the lower surface of the stationary drum.

6. A rotary magnetic head drum assembly according to claim 4, wherein the the connector base plate of the connector assembly is provided with slots, and the connector base plate is fastened to the lower surface of the drum base with screws screwed through the slots in threaded holes formed in the lower surface of the drum base.

7. A rotary magnetic head drum assembly according to claim 6 wherein said slots re wider than the diameter of said screws and said screws include shoulders having an axial dimensions greater than the thickness of said connector base plate, thereby permitting movement of said connector base plate in a direction parallel to its thickness and in a direction perpendicular thereto so as to permit adjustment in the alignment of said spring pins with said input and output terminals.

8. A rotary magnetic head drum assembly according to claim 1, wherein said input and output terminals comprise lands disposed on a terminal board, the terminal board being attached to said lower surface of the stationary magnetic head drum and opposite said connector base plate, and said lands being in contact with said spring pins, respectively.

* * * * *